US007130116B2

(12) United States Patent
Tokunaga et al.

(10) Patent No.: US 7,130,116 B2
(45) Date of Patent: Oct. 31, 2006

(54) MICROSCOPE APPARATUS HAVING AN OBJECTIVE DISPLACEMENT DETECTION SYSTEM

(75) Inventors: Makio Tokunaga, Mishima (JP); Yoshihiro Ue, Hidaka (JP)

(73) Assignees: Research Organization of Information and Systems, Tokyo (JP); Olympus Corporation, Tokyo (JP)

(*) Notice: Subject to any disclaimer, the term of this patent is extended or adjusted under 35 U.S.C. 154(b) by 0 days.

(21) Appl. No.: 11/128,973

(22) Filed: May 13, 2005

(65) Prior Publication Data

US 2005/0207004 A1 Sep. 22, 2005

Related U.S. Application Data

(63) Continuation of application No. PCT/JP04/09691, filed on Jul. 1, 2004.

(30) Foreign Application Priority Data

Jul. 2, 2003 (JP) .............................. 2003-190417

(51) Int. Cl.
*G02B 21/00* (2006.01)
*G02B 7/04* (2006.01)
*G02B 21/26* (2006.01)
(52) U.S. Cl. ..................... 359/383; 359/368
(58) Field of Classification Search ........... 359/383, 359/392, 368
See application file for complete search history.

(56) References Cited

U.S. PATENT DOCUMENTS 6,172,373 B1 * 1/2001 Hara et al. .................. 250/548

6,801,650 B1 * 10/2004 Kikuchi et al. ............. 382/145
2002/0015225 A1 * 2/2002 Ue ............................. 359/383

FOREIGN PATENT DOCUMENTS

| JP | 9-120030 A | 5/1997 |
| JP | 2001-83391 A | 3/2001 |
| JP | 2001-305432 A | 10/2001 |
| JP | 2002-258163 A | 9/2002 |
| JP | 2002-341248 A | 11/2002 |
| JP | 2003294419 A * | 10/2003 |

OTHER PUBLICATIONS

Notification of Transmittal of Copies of Translation of the International Preliminary Report on Patentability, Chapter I or Chapter II of the Patent Cooperation Treaty for PCT/JP2004/009691, 7 sheets.

* cited by examiner

*Primary Examiner*—Mark A. Robinson
*Assistant Examiner*—Mark Consilvio
(74) *Attorney, Agent, or Firm*—Frishauf, Holtz, Goodman & Chick, P.C.

(57) ABSTRACT

The microscope apparatus has an objective lens, a sample base on which an observation sample is placed, a sensor target mounted on the tip portion of the objective lens, and a non-contact sensor mounted on the sample base. The non-contact sensor detects the distance to the sensor target. The microscope further has a motor that moves the objective lens along the optical axis and the controller that controls the motor to keep the relative distance between the tip portion of the objective lens 5 and the sample base constant while the control switch is ON.

6 Claims, 5 Drawing Sheets

MICROSCOPE APPARATUS HAVING AN OBJECTIVE DISPLACEMENT DETECTION SYSTEM

CROSS REFERENCE TO RELATED APPLICATIONS

This is a Continuation Application of PCT Application No. PCT/JP2004/009691, filed Jul. 1, 2004, which was published under PCT Article 21(2) in Japanese.

This application is based upon and claims the benefit of priority from prior Japanese Patent Application No. 2003-190417, filed Jul. 2, 2003, the entire contents of which are incorporated herein by reference.

BACKGROUND OF THE INVENTION

1. Field of the Invention

The present invention relates to a microscope apparatus.

2. Description of the Related Art

In general, sample observation using a microscope is performed so that an objective lens is brought close to a sample placed on a microscope stage to magnify a target observation part on the sample. In this case, the objective lens brought close to the sample decreases in depth of focus with an increase in magnification, leading to difficulty in positioning the objective lens to the observation sample. In addition, even a slight change in the distance between the objective lens and the sample will greatly degrade an observation image.

Although the apparent positions of the objective lens and observation sample are very close to each other, the mechanical linkage length of them is very large because of the interposition of many mechanical parts such as a microscope frame, objective lens moving mechanism, and revolver. These mechanical parts tend to change their dimensions due to changes in temperature. As the number of mechanical parts increases, therefore, the amount of change in dimension increases. In addition, as the mechanical linkage length increases with an increase in the number of mechanical parts, this structure is susceptible to vibrations, resulting in a large vibration amplitude.

Even if, therefore, the objective lens is focused on the observation sample at the time of observation, the distance between the objective lens and the sample greatly changes as the dimensions of the respective mechanical parts change with a change in ambient temperature due to the operation of air conditioning equipment. This readily causes defocusing. In addition, when slight external vibrations are applied to this structure, the distance between the objective lens and the sample changes due to a large vibration amplitude. This readily causes defocusing in the optical axis direction or horizontal direction.

For the reasons described above, even if the focus is adjusted on an observation sample at the time of observation using a microscope, as the ambient temperature changes due to the ON/OFF operation of an illumination lamp and the activation of an internal power supply and air conditioner, the dimensions of mechanical parts change to change the distance between the objective lens and the sample. This causes defocusing.

BRIEF SUMMARY OF THE INVENTION

A microscope apparatus according to the present invention comprises an objective lens, a sample base on which an observation sample is placed, a displacement detection system that detects a relative distance between a tip portion of the objective lens and the sample base, a moving mechanism that moves the objective lens along an optical axis relative to the sample base, and a control unit that controls the moving mechanism on the basis of information detected by the displacement detection system to adjust the relative distance between the tip portion of the objective lens and the sample base.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows how the member holding the objective lens thermally expands to elongate due to a change in ambient temperature or the like;

FIG. 6 shows how the member holding the objective lens thermally expands to elongate and is inclined due to a change in ambient temperature or the like;

DETAILED DESCRIPTION OF THE INVENTION

The embodiments of the present invention will be described below with reference to the views of the accompanying drawing.

First Embodiment

Figure 1:
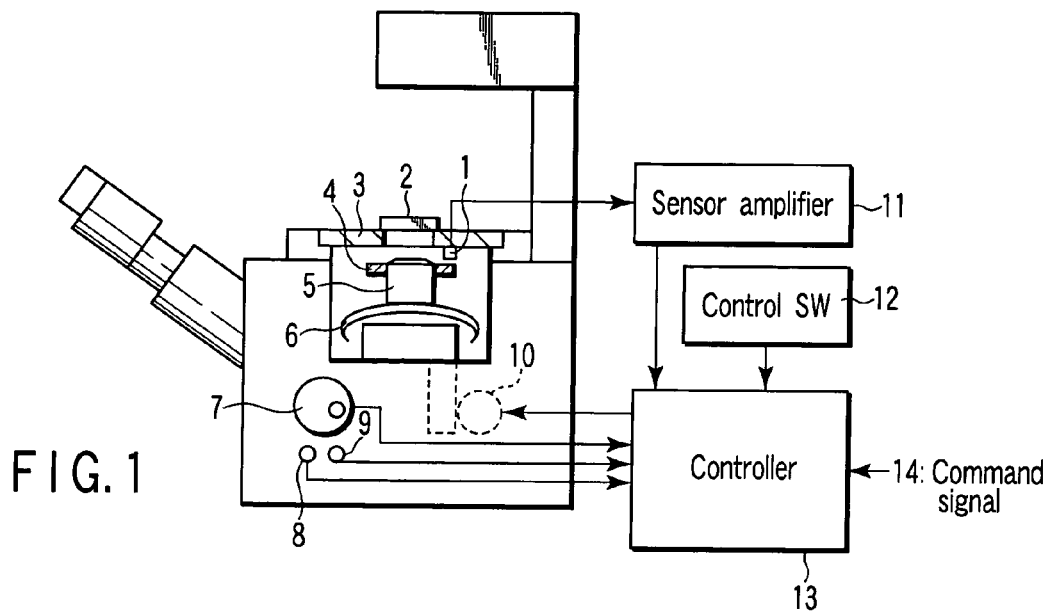
FIG. 1 shows a microscope apparatus according to the first embodiment of the present invention.

This embodiment is directed to an inverted microscope apparatus. FIG. 1 shows a microscope apparatus according to the first embodiment of the present invention.

As shown in FIG. 1, the microscope apparatus of this embodiment has an objective lens 5, a sample base 3 on which an observation sample 2 is placed, a sensor target 4 mounted on the tip portion of the objective lens 5, and a non-contact sensor 1 mounted on the sample base 3.

The sample base 3 has an optical aperture. The objective lens 5 is located on the opposite side of the observation sample 2 placed on the sample base 3 with reference to the sample base 3, and can collect light from the observation sample 2 through the optical aperture of the sample base 3.

The non-contact sensor 1 detects the distance to the sensor target 4. The non-contact sensor 1 is, but not limited to, a capacitance sensor, for example. Accordingly, the sensor target 4 is of a conductive material. The sensor target 4 and non-contact sensor 1 constitute a displacement detection system that detects the relative distance between the tip portion of the objective lens 5 and the sample base 3.

In this case, "detects the relative distance" means to detect a change in relative distance. This is not limited to obtaining the magnitude of an actual change in relative distance in the form of a numerical value, and broadly means that some kind of information reflecting an actual change in relative distance is obtained. Obviously, this also includes actually measuring a relative distance.

The microscope further has a revolver 6 that holds the objective lens 5, a motor 10 that moves the objective lens 5 together with the revolver 6 along the optical axis, and a controller 13 serving as a control unit that controls the motor 10 to adjust the relative distance between the tip portion of the objective lens 5 and the sample base 3.

The controller 13 can preferably adjust the relative distance between the tip portion of the objective lens 5 and the sample base 3 in steps smaller than the focal depth of the observation optical system including the objective lens 5.

The motor 10 comprises a moving mechanism that moves the objective lens 5 together with a support mechanism for the revolver 6 along the optical axis relative to the sample base 3.

The microscope also has a sensor amplifier 11 that amplifies a detection signal output from the non-contact sensor 1, and a control switch 12 that instructs ON/OFF control for keeping the relative distance between the tip portion of the objective lens 5 and the sample base 3 constant. In response to the ON control instruction from the control switch 12, the controller 13 controls the motor 10 to keep the relative distance between the tip portion of the objective lens 5 and the sample base 3 constant on the basis of the information detected by the non-contact sensor 1 that is input through the sensor amplifier 11.

The microscope apparatus further has a focusing handle 7 for focusing, a retract switch 8 that retracts the objective lens 5, and a return switch 9 that returns the objective lens 5 to the original position. The focusing handle 7 outputs a signal reflecting its rotational direction to the controller 13. The controller 13 controls the motor 10 in accordance with this signal to move the objective lens 5 along the optical axis. The controller 13 controls the motor 10 in response to ON operation of the retract switch 8 to move the objective lens 5 away from the sample base 3. In contrast, in response to ON operation of the return switch 9, the controller 13 controls the motor 10 to bring the objective lens 5 close to the sample base 3 and return the lens to the position before the retraction.

The controller 13 also controls the motor 10 so as to move the objective lens 5 along the optical axis in accordance with a command signal 14 input from an operator through an appropriate interface.

Figure 2:
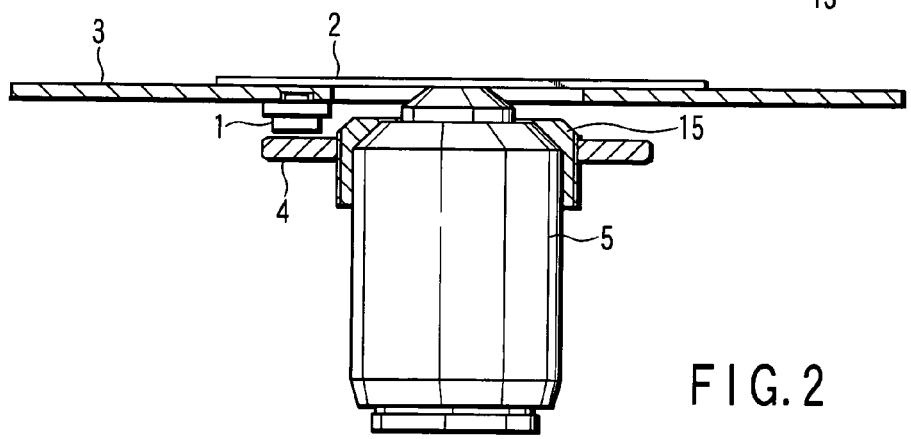
FIG. 2 shows, in an enlarged form, an objective lens and its surroundings shown in FIG. 1.

FIG. 2 shows, in an enlarged form, the object lens and its surroundings shown in FIG. 1. As shown in FIG. 2, a target support member 15 conforming to the shape of the objective lens 5 is fitted on the tip portion of the objective lens 5. The target support member 15 has an almost cylindrical shape, and has a thread on its outer surface. The sensor target 4 has a ring-like shape, and its inner surface has a thread that matches the thread of the target support member 15. The sensor target 4 is threadably engaged with the target support member 15.

The sensor target 4 can be moved along the optical axis, i.e., up and down, by rotating the sensor target 4 around the target support member 15. The measurement range of the non-contact sensor 1 decreases with an increase in resolution. For this reason, the vertical position of the sensor target 4 is preferably adjusted so that the sensor target 4 is located near the center of the measurement range of the non-contact sensor 1 in the in-focus state.

Referring to FIG. 1, when the focusing handle 7 is rotated, it outputs a signal reflecting its rotational direction to the controller 13. The controller 13 controls the motor 10 in accordance with the input signal to move the objective lens 5 along the optical axis, i.e., up and down.

The displacement detection system comprising the non-contact sensor 1 and sensor target 4 always detects the relative distance between the tip portion of the objective lens 5 and the sample base 3. A detection signal output from the non-contact sensor 1 is amplified by the sensor amplifier 11 and read by the controller 13.

While the control switch 12 is ON, the controller 13 performs control to keep the relative distance between the tip portion of the objective lens 5 and the sample base 3 constant.

Figure 3:
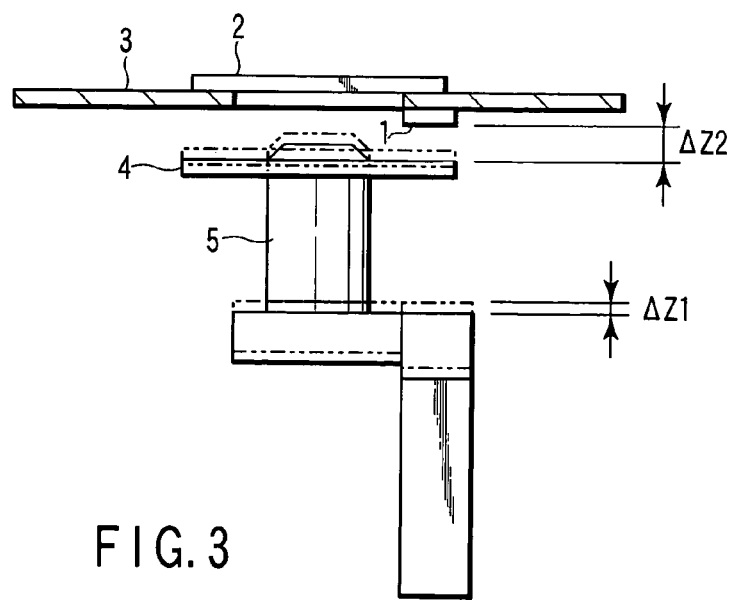

Under such control, for example, as shown in FIG. 3, when the member holding the objective lens 5 thermally expands to elongate by $\Delta Z1$ due to a change in ambient temperature or the like, the relative distance between the distance end portion of the objective lens 5 and the sample base 3 decreases accordingly. This change is detected by the non-contact sensor 1, and the detection signal is read by the controller 13 through the sensor amplifier 11.

The controller 13 calculates the direction in which and the distance by which the objective lens 5 is to be moved to return the relative distance to a relative distance $\Delta Z2$ before the change on the basis of the input detection signal, and controls the motor 10 in accordance with the calculation result. With this operation, the objective lens 5 is moved away from the sample base 3 to return the relative distance between the tip portion of the objective lens 5 and the sample base 3 to the relative distance $\Delta Z2$ before the change.

This control is continued while the control switch 12 is ON. As a consequence, the relative distance between the tip portion of the objective lens 5 and the sample base 3 is always maintained at a constant value while the control switch 12 is ON.

Upon receiving the command signal 14 or a signal from the focusing handle 7, the controller 13 controls the motor 10 in accordance with the input signal to move the objective lens 5 along the optical axis, regardless of whether the control switch 12 is ON or OFF. If the control switch 12 is ON, the controller 13 moves the objective lens 5 first in accordance with the command signal 14 or the signal from the focusing handle 7, and then controls the motor 10 to maintain the relative distance between the tip portion of the objective lens 5 and the sample base 3 at the distance immediately after the movement.

When objective lenses 5 are mounted on the revolver 6, the objective lenses 5 may need to be switched during observation. While the observation sample 2 is observed, the objective lens 5 and sensor target 4 are located near the non-contact sensor 1. If, therefore, the revolver 6 is rotated in this state, these members may come into contact with each other. This may adversely affect the observation sample 2.

For this reason, when the objective lenses 5 are to be switched, the retract switch 8 is pressed so that the objective lens 5 is retracted. After the objective lenses 5 are switched, the return switch 9 is pressed so that the objective lens 5 is returned to the original position.

When the retract switch 8 is pressed, the retract switch 8 outputs a retract signal to the controller 13. The controller 13 controls the motor 10 in accordance with the retract signal to lower the objective lens 5. With this operation, the objective lens 5 is moved to a position sufficient distant from the sample base 3, thus allowing the objective lenses 5 to be switched by the rotation of the revolver 6. When the objective lens 5 is retracted, the controller 13 stores the relative distance between the tip portion of the objective lens 5 and the sample base 3 before the retraction.

When the return switch 9 is pressed, the return switch 9 outputs a return signal to the controller 13. The controller 13 controls the motor 10 in accordance with the input return signal to raise the objective lens 5, so as to return the relative distance between the tip portion of the objective lens 5 and the sample base 3 to the distance stored at the time of the retraction.

If the position of the objective lens 5 after the return is not proper, the focusing handle 7 is rotated to adjust the position of the objective lens 5.

As is obvious from the above description, in the microscope apparatus according to this embodiment, the relative distance between the tip portion of the objective lens 5 and the sample base 3 can be maintained at a constant value, if necessary, without being influenced by a change in ambient temperature, vibrations, or the like. Accordingly, it is possible to effectively suppress the occurrence of defocusing even during observation over a long period of time.

Second Embodiment

Figure 4:
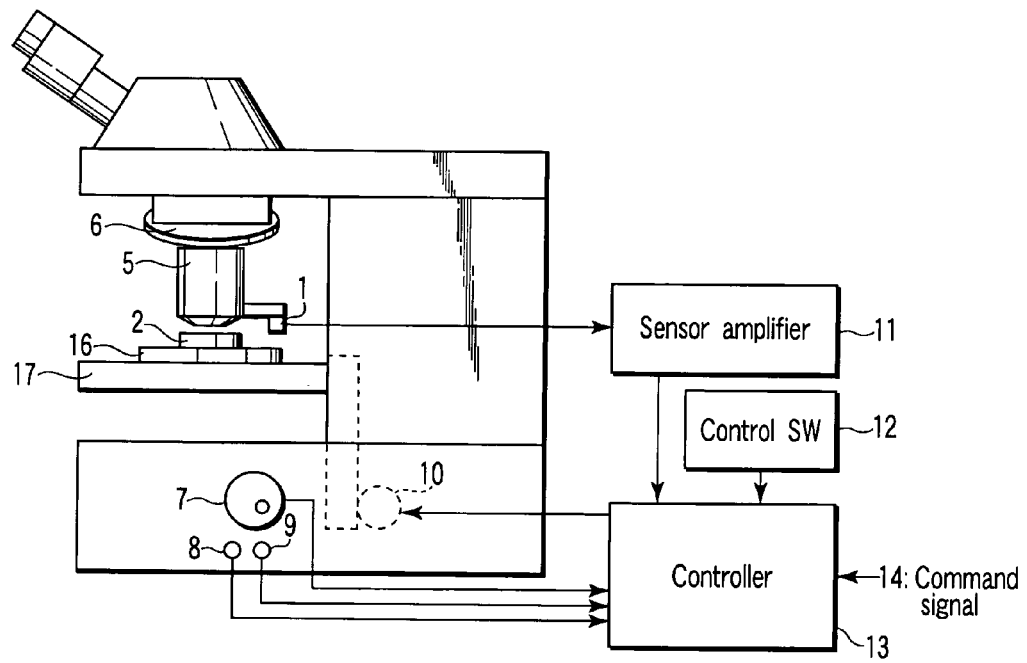
FIG. 4 shows a microscope apparatus according to the second embodiment of the present invention.

This embodiment is directed to an upright microscope apparatus. FIG. 4 shows a microscope apparatus according to the second embodiment of the present invention. The same reference numerals as in FIG. 1 denote the same parts in FIG. 4.

As shown in FIG. 4, the microscope of this embodiment has an objective lens 5, a non-contact sensor 1 mounted on the tip portion of the objective lens 5, a sample base 16 on which an observation sample 2 is placed, and a stage 17 on which the sample base 16 is mounted.

The objective lens 5 is located at the same side of the observation sample 2 placed on the sample base 16 with reference to the sample base 16.

The non-contact sensor 1 detects the distance from the sample base 16. The non-contact sensor 1 is, but not limited to, a capacitance sensor, for example. Accordingly, the sample base 16 has a conductive part at least near its upper surface on which the observation sample 2 is placed. The sample base 16 may be one that has a film of a conductive material on its upper surface or one that is made of a conductive material itself.

The conductive part near the upper surface of the sample base 16 serves as a sensor target for the non-contact sensor 1. The non-contact sensor 1 and sensor target constitute a displacement detection system that detects the relative distance between the tip portion of the objective lens 5 and the sample base 16.

The microscope further has a revolver 6 that holds the objective lens 5, a motor 10 that moves the sample base 16 together with the stage 17 along the optical axis, and a controller 13 serving as a control unit that controls the motor 10 to adjust the relative distance between the tip portion of the objective lens 5 and the sample base 16.

The controller 13 can preferably adjust the relative distance between the tip portion of the objective lens 5 and the sample base 3 in steps smaller than the focal depth of the observation optical system including the objective lens 5.

The motor 10 comprises a moving mechanism that moves the objective lens 5 together with a support mechanism for the stage 17 along the optical axis relative to the sample base 16.

The microscope also has a sensor amplifier 11 that amplifies a detection signal output from the non-contact sensor 1, and a control switch 12 that instructs ON/OFF control for keeping the relative distance between the tip portion of the objective lens 5 and the sample base 16 constant. In response to the ON control instruction from the control switch 12, the controller 13 controls the motor 10 to keep the relative distance between the tip portion of the objective lens 5 and the sample base 16 constant on the basis of the information detected by the non-contact sensor 1 that is input through the sensor amplifier 11.

The microscope apparatus further has a focusing handle 7 for focusing, a retract switch 8 that retracts the objective lens 5, and a return switch 9 that returns the objective lens 5 to the original position. The focusing handle 7 outputs a signal reflecting its rotational direction to the controller 13. The controller 13 controls the motor 10 in accordance with this signal to move the objective lens 5 along the optical axis. The controller 13 controls the motor 10 in response to ON operation of the retract switch 8 to move the objective lens 5 away from the sample base 16. In contrast, in response to ON operation of the return switch 9, the controller 13 controls the motor 10 to bring the objective lens 5 close to the sample base 16 and return the lens to the position before the retraction.

The controller 13 also controls the motor 10 to move the objective lens 5 along the optical axis in accordance with a command signal 14 input from an operator through an appropriate interface.

Referring to FIG. 4, when the focusing handle 7 is rotated, it outputs a signal reflecting its rotational direction to the controller 13. The controller 13 controls the motor 10 in accordance with the input signal to move the stage 17 along the optical axis, i.e., up and down.

The displacement detection system comprising the non-contact sensor 1 and sensor target (the conductive part of the sample base 16) always detects the relative distance between the tip portion of the objective lens 5 and the sample base 16. A detection signal output from the non-contact sensor 1 is amplified by the sensor amplifier 11 and read by the controller 13.

While the control switch 12 is ON, the controller 13 performs control to keep the relative distance between the tip portion of the objective lens 5 and the sample base 16 constant.

Under such control, for example, when the member holding the objective lens 5 thermally expands to elongate due to a change in ambient temperature, the relative distance between the distance end portion of the objective lens 5 and the sample base 16 decreases accordingly. This change is detected by the non-contact sensor 1, and the detection signal is read by the controller 13 through the sensor amplifier 11.

The controller 13 calculates the direction in which and the distance by which the stage 17 is to be moved to return the relative distance to the relative distance before the change on the basis of the input detection signal, and controls the motor 10 in accordance with the calculation result. With this operation, the sample base 16 is moved away from the objective lens 5 to return the relative distance between the tip portion of the objective lens 5 and the sample base 16 to the relative distance before the change.

This control is continued while the control switch 12 is ON. As a consequence, the relative distance between the tip portion of the objective lens 5 and the sample base 16 is always maintained at a constant value while the control switch 12 is ON.

Upon receiving the command signal 14 or a signal from the focusing handle 7, the controller 13 controls the motor 10 in accordance with the input signal to move the stage 17 along the optical axis, regardless of whether the control switch 12 is ON or OFF. If the control switch 12 is ON, the controller 13 moves the stage 17 first in accordance with the command signal 14 or the signal from the focusing handle 7, and then controls the motor 10 to maintain the relative distance between the tip portion of the objective lens 5 and the sample base 16 at the distance immediately after the movement.

When objective lenses 5 are mounted on the revolver 6, the objective lenses 5 may need to be switched during observation. While the observation sample 2 is observed, the objective lens 5 and non-contact sensor 1 are located near the observation sample 2 or sample base 16. If, therefore, the revolver 6 is rotated in this state, these members may come into contact with each other. This may adversely affect the observation sample 2.

For this reason, when the objective lenses 5 are to be switched, the retract switch 8 is pressed to move the stage 17 away from the objective lens 5. After the objective lenses 5 are switched, the return switch 9 is pressed to return the stage 17 to the original position.

When the retract switch 8 is pressed, the retract switch 8 outputs a retract signal to the controller 13. The controller 13 controls the motor 10 in accordance with the retract signal to lower the stage 17. With this operation, the observation sample 2 is sufficiently moved away from the objective lens 5, thus allowing the objective lenses 5 to be switched by the rotation of the revolver 6. When the stage 17 is retracted, the controller 13 stores the relative distance between the tip portion of the objective lens 5 and the sample base 16 before the retraction.

When the return switch 9 is pressed, the return switch 9 outputs a return signal to the controller 13. The controller 13 controls the motor 10 in accordance with the input return signal to raise the stage 17, so as to return the relative distance between the tip portion of the objective lens 5 and the sample base 16 to the distance stored at the time of the retraction.

If the position of the stage 17 after the return is not proper, the focusing handle 7 is rotated to adjust the position of the stage 17.

As is obvious from the above description, in the microscope apparatus according to this embodiment, the relative distance between the tip portion of the objective lens 5 and the sample base 16 can be maintained at a constant value, if necessary, without being influenced by a change in ambient temperature, vibrations, or the like. Accordingly, it is possible to effectively suppress the occurrence of defocusing even during observation over a long period of time.

Third Embodiment

Figure 5:
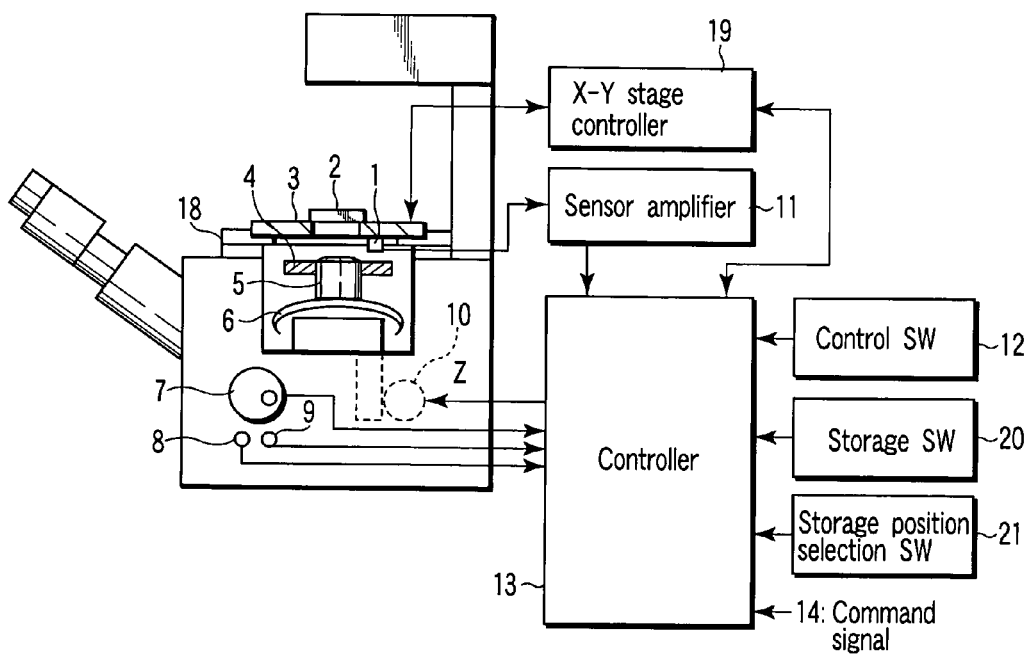
FIG. 5 shows a microscope apparatus according to the third embodiment of the present invention.

This embodiment is directed to another inverted microscope apparatus. FIG. 5 shows a microscope apparatus according to the third embodiment of the present invention.

The same reference numerals as in FIG. 1 denote the same parts in FIG. 5, and a detailed description thereof will be omitted.

As is obvious by comparing FIG. 5 with FIG. 1, in addition to the arrangement of the microscope apparatus according to the first embodiment, the microscope apparatus of this embodiment has an X-Y stage 18 that supports a sample base 3 to allow it to move along a plane perpendicular to the optical axis, an X-Y stage controller 19 that controls the X-Y stage 18, a storage switch 20 that instructs to store an observation position, and a storage position selection switch 21 that instructs to select the stored observation position and move.

The X-Y stage 18 can move the sample base 3 mounted thereon along two axes (the so-called X-axis and Y-axis) that are included in a plane perpendicular to the optical axis and are perpendicular to each other.

The microscope apparatus according to this embodiment can operate in the same manner as the microscope apparatus according to the first embodiment. That is, a controller 13 controls a motor 10 to keep the relative distance between the tip portion of an objective lens 5 and the sample base 3 constant while a control switch 12 is ON. Upon receiving a command signal 14 or a signal from a focusing handle 7, the controller 13 controls the motor 10 in accordance with the input signal to move the objective lens 5 along the optical axis, regardless of whether the control switch 12 is ON or OFF. In addition, when a retract switch 8 is pressed, the controller 13 lowers the objective lens 5. When a return switch 9 is pressed, the controller 13 raises the objective lens 5 to the original position.

In addition to these components, in the microscope apparatus of this embodiment, the controller 13 includes a storage unit that stores an X-Y position signal supplied from the X-Y stage controller 19 to the X-Y stage 18 when a storage switch 20 is pressed, and a detection signal from a sensor amplifier 11. With this arrangement, an observation position in an observation sample 2 and the relative distance between the tip portion of the objective lens 5 and the sample base 3 at the observation position are stored. When the storage position selection switch 21 is pressed, the controller 13 controls the X-Y stage controller 19 to move the X-Y stage 18, and controls the motor 10 to move the objective lens 5, in accordance with a signal from the storage position selection switch 21. With this operation, the observation position in the observation sample 2 is located on the optical axis, and the relative distance between the tip portion of the objective lens 5 and the sample base 3 is adjusted.

The microscope apparatus of this embodiment is very convenient for time-lapse observation, in which, for example, observation images are repeatedly taken at proper time intervals for a long period of time. In long-time observation, since a portion at the same position is observed for a long time of several ten hours, a mechanical drift may occur in the microscope due to a change in ambient temperature during observation. Even if, however, the ambient temperature changes, since the relative distance between the tip portion of the objective lens 5 and the sample base 3 is kept constant, no observation image blurs, and good observation images can be obtained for a long period of time.

Assume that in time-lapse observation, there are observation positions. In this case, by pressing the storage switch 20 at each desired observation position, an X-Y signal from the X-Y stage controller 19 and a detection signal from the sensor amplifier 11 are stored in the controller 13. When time-lapse observation is started, the controller 13 takes observation images at the respective observation positions while sequentially moving the X-Y stage 18 and objective lens 5 to the stored positions. This operation is repeated at set time intervals. Accordingly, it is possible to perform time-lapse observation at many observation positions and obtain good observation images without blur.

In the microscope apparatus of this embodiment, a non-contact sensor 1 is placed on an axis that passes through the center of the objective lens 5 when it is not inclined and is perpendicular to the expected inclination direction of the objective lens 5.

Figure 6:
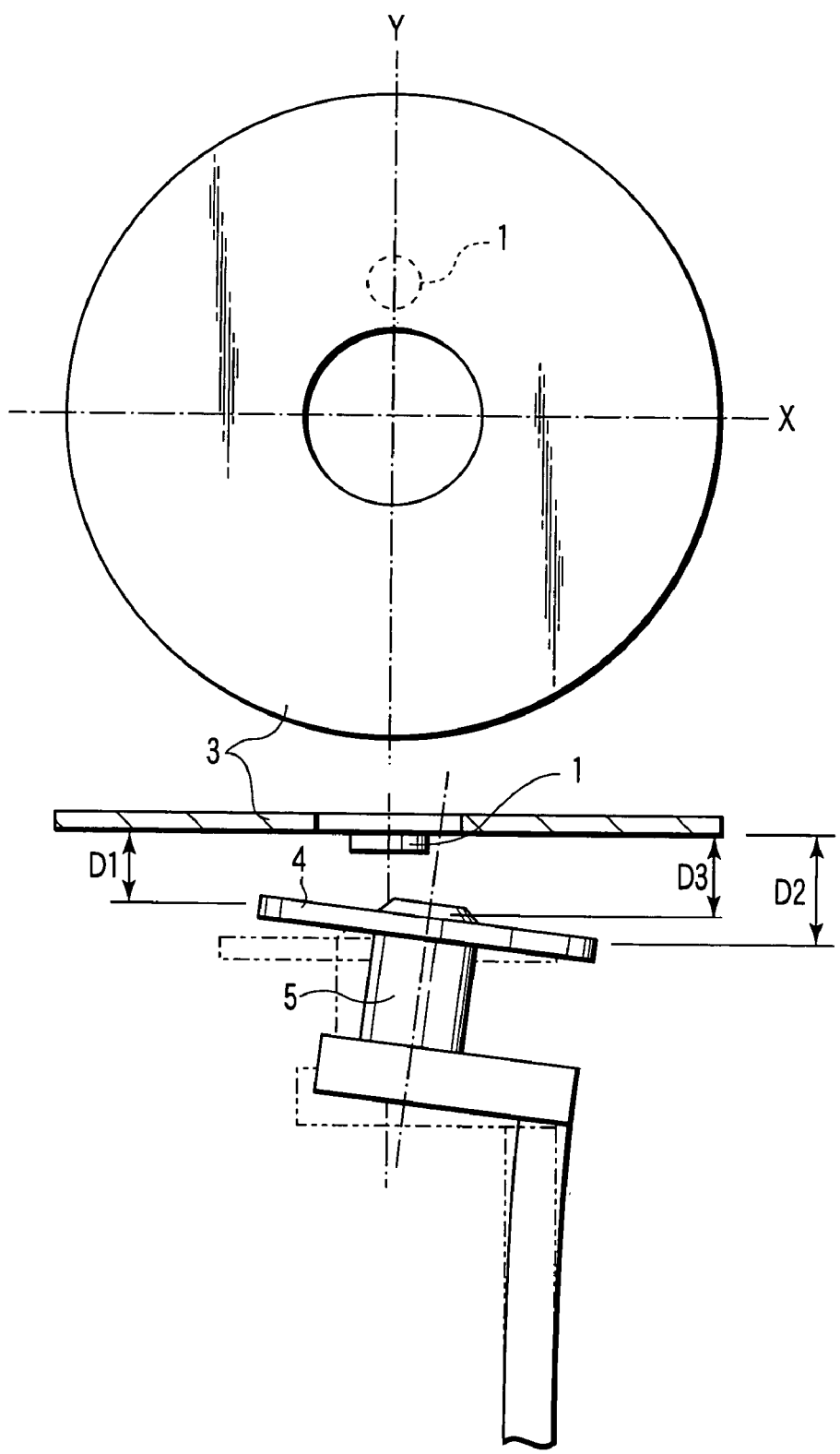

FIG. 6 shows how the member holding the objective lens 5 thermally expands to elongate and is inclined due to a change in ambient temperature or the like. When the objective lens 5 is inclined along the X-axis as shown in FIG. 6, the distance between the lower surface of the sample base 3 and a sensor target 4 is represented by D1 on the left side of the X-axis, but is represented by D2 (>D1) on the right side of the X-axis. That is, the distance changes depending on the position on the X-axis. For this reason, when the non-contact sensor 1 is located on the X-axis, the relative distance to the sensor target 4 cannot be accurately detected.

In order to avoid such inconveniences, in the microscope apparatus of this embodiment, the non-contact sensor 1 is placed on an axis, i.e., the Y-axis that passes through the center of the objective lens 5 when it is not inclined and is perpendicular to the expected inclination direction of the objective lens 5. As is easily understood from FIG. 6, the distance between the lower surface of the sample base 3 and the sensor target 4 on the Y-axis hardly changes even when the objective lens 5 is inclined along the X-axis.

Accordingly, it is possible to correctly detect the relative distance between the tip portion of the objective lens 5 and the sample base 3 even when the objective lens 5 is inclined along the X-axis.

Fourth Embodiment

Figure 7:
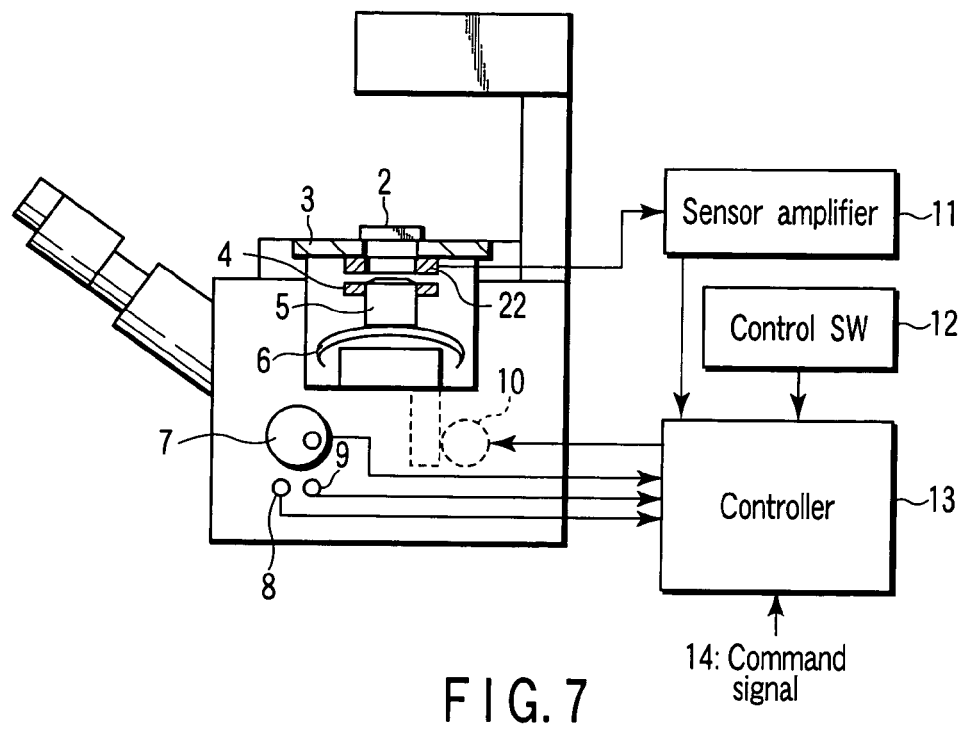
FIG. 7 shows a microscope apparatus according to the fourth embodiment of the present invention.

This embodiment is directed to another inverted microscope apparatus. FIG. 7 shows a microscope apparatus according to the fourth embodiment of the present invention.

As shown in FIG. 7, the microscope apparatus of this embodiment differs from the microscope apparatus of the first embodiment only in a non-contact sensor, and other arrangements are the same as those of the microscope apparatus of the first embodiment. Different portions will be described below.

In the microscope apparatus of this embodiment, a non-contact sensor 22 has a ring-like shape and surrounds the optical aperture of a sample base 3. As described above, a sensor target 4 has a ring-like shape and surrounds an objective lens 5. The non-contact sensor 22 is, for example, a capacitance sensor, although not limited to this, and faces the sensor target 4.

Figure 8:
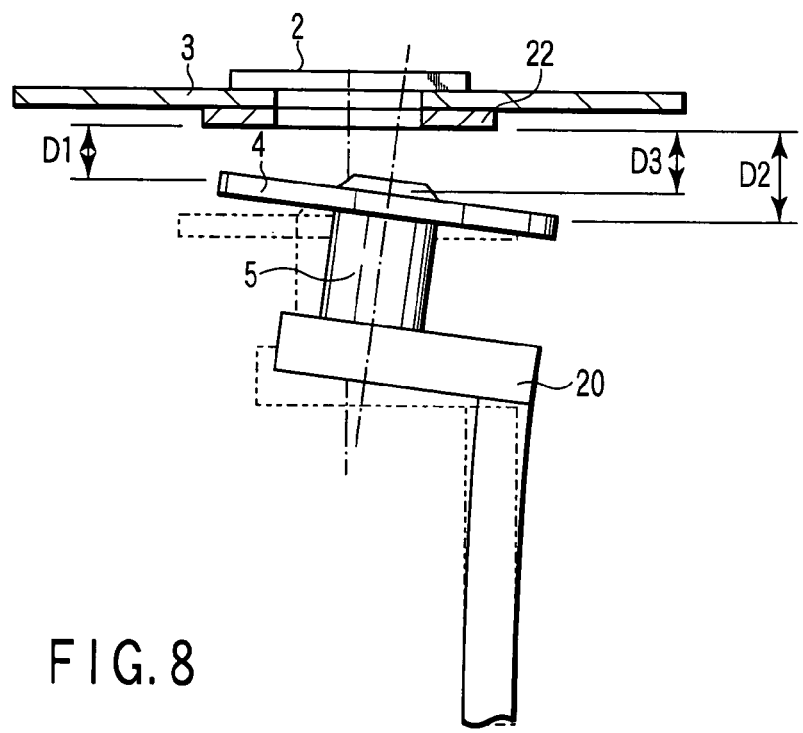
FIG. 8 shows, in an enlarged form, an objective lens and its surroundings shown in FIG. 7 and the inclined state of the objective lens.

FIG. 8 shows, in an enlarged form, the objective lens and its surroundings shown in FIG. 7 and the inclined state of the objective lens. As shown in FIG. 8, when the objective lens 5 is inclined, the distance between the non-contact sensor 22 and the sensor target 4 changes depending on the position, as indicated by D1 and D2.

The non-contact sensor 22 outputs a detection signal reflecting an average distance D3 between the non-contact sensor 22 and the sensor target 4.

With this operation, in addition to the same merits as those of the first embodiment, the microscope apparatus of this embodiment has the merit of being capable of properly detecting the relative distance between the tip portion of the objective lens 5 and the sample base 3 regardless of the direction in which the objective lens 5 is inclined.

In addition, the non-contact sensor 22 has a ring-like shape, and has a relatively large sensor area. The non-contact sensor 22 therefore has a relatively wide measurement range. The microscope apparatus of this embodiment is also advantageous in that the control/drive range of the objective lens 5 is large accordingly.

Fifth Embodiment

Figure 9:
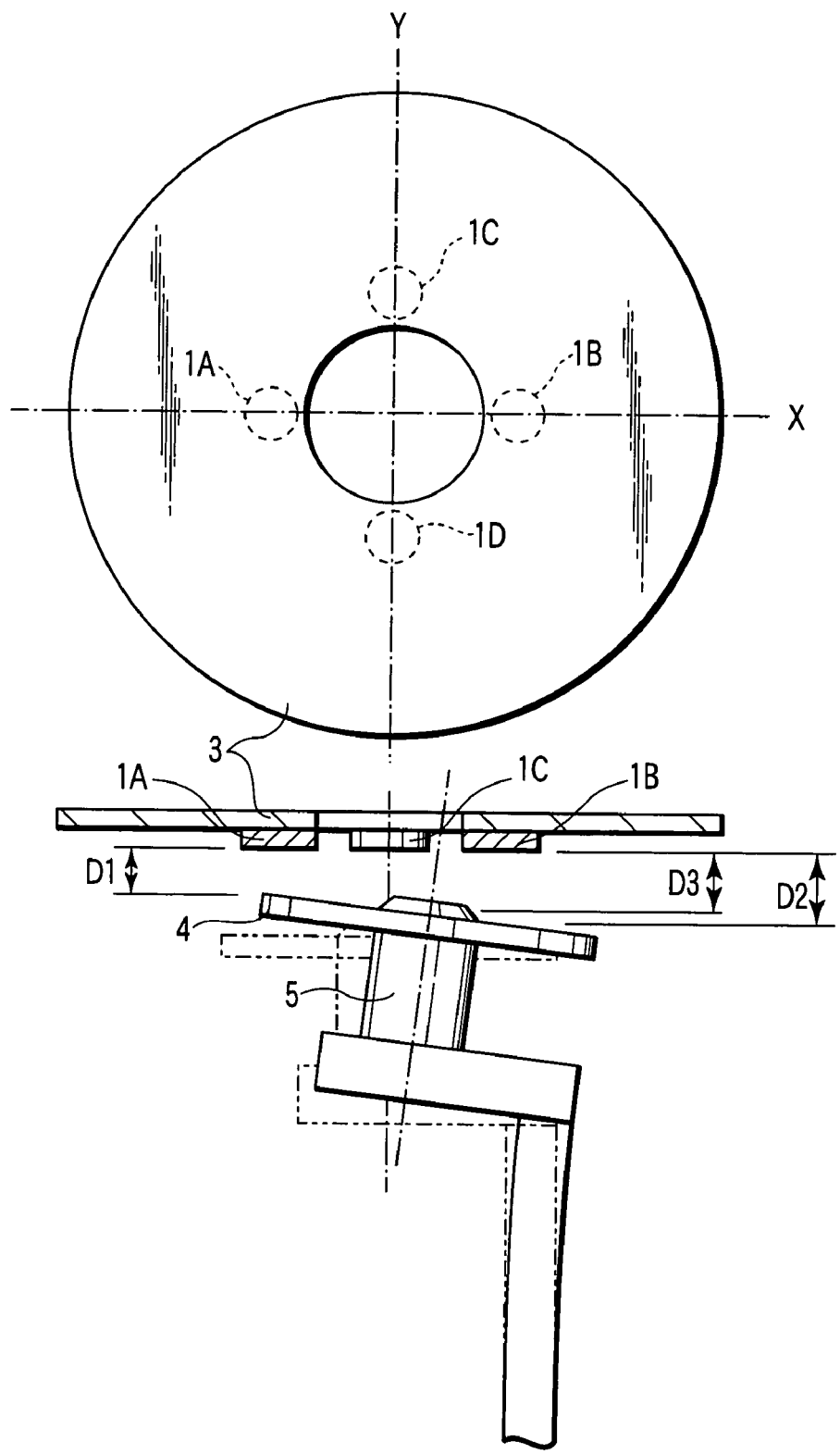
FIG. 9 shows, in an enlarged form, an objective lens and its surroundings shown in a microscope apparatus according to the fifth embodiment of the present invention and the inclined state of the objective lens.

This embodiment is directed to another inverted microscope apparatus. FIG. 9 shows, in an enlarged form, an objective lens and its surroundings in a microscope apparatus according to the fifth embodiment of the present invention and the inclined state of the objective lens.

As shown in FIG. 9, the microscope apparatus of this embodiment differs from the microscope apparatus of the first embodiment only in a non-contact sensor, and other arrangements are the same as those of the microscope apparatus of the first embodiment. Different portions will be described below.

As shown in FIG. 9, the microscope apparatus of this embodiment has four non-contact sensors 1A, 1B, 1C, and 1D. They are arranged around the optical aperture of a sample base 3. For example, two of the four non-contact sensors 1A to 1D are located on the X-axis, and the remaining two are located on the Y-axis. As described above, a sensor target 4 has a ring-like shape and surrounds an objective lens 5. All the four non-contact sensors 1A to 1D face the sensor target 4.

In the microscope apparatus of this embodiment, the non-contact sensor 1A located on the left side of the X-axis outputs a detection signal reflecting a relative distance D1, the non-contact sensor 1B located on the right side of the X-axis outputs a detection signal reflecting a relative distance D2, and both the non-contact sensors 1C and 1D located on the Y-axis output detection signals reflecting a relative distance D3.

In this embodiment, a controller 13 obtains the average of the relative distances between the four non-contact sensors 1A to 1D and the sensor target 4 by calculating the average of detection signals from the four non-contact sensors 1A, 1B, 1C, and 1D.

With this operation, in addition to the same merits as those of the first embodiment, the microscope apparatus of this embodiment has the merit of being capable of properly detecting the relative distance between the tip portion of the objective lens 5 and the sample base 3 regardless of the direction in which the objective lens 5 is inclined.

This embodiment has exemplified the apparatus having four non-contact sensors 1A to 1D. The number of sensors is not limited to this. For example, three sensors or five or more sensors may be used.

Although the present invention has been described with reference to the views of the accompanying drawing, the present invention is not limited to these embodiments, and various changes and modifications may be made within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope apparatus, which optically observes an observation sample, comprising:

an objective lens;

a sample base on which the observation sample is placed;

a sensor target mounted on a tip portion of the objective lens;

a member which holds the objective lens and which is caused to elongate and incline by thermal expansion due to a change in ambient temperature;

a capacitance type non-contact sensor mounted on the sample base and positioned on an axis that passes through a center of the objective lens when the objective lens is not inclined and that is perpendicular to an expected inclination direction of the objective lens;

a displacement detection system that detects a relative distance between the tip portion of the objective lens and the sample base via the capacitance type non-contact sensor and the sensor target;

a moving mechanism that moves the objective lens along an optical axis relative to the sample base; and a control unit that controls the moving mechanism based on information detected by the displacement detection system to keep the relative distance between the tip portion of the objective lens and the sample base constant, so as to maintain a focused condition.

2. A microscope apparatus according to claim 1, further comprising an observation optical system including the objective lens, wherein the control unit adjusts the relative distance between the tip portion of the objective lens and the sample base in steps smaller than a focal depth of the observation optical system.

3. A microscope apparatus according to claim 2, wherein the control unit includes a storage unit that stores a predetermined observation position and a relative distance between the tip portion of the objective lens and the sample base at the observation position, and adjusts the relative distance between the tip portion of the objective lens and the sample base to the relative distance stored in the storage unit at predetermined time intervals.

4. A microscope apparatus, which optically observes an observation sample, comprising:

an objective lens;

a sample base on which the observation sample is placed;

a member which holds the objective lens and which is caused to elongate and incline by thermal expansion due to a change in ambient temperature;

a displacement detection system which includes a sensor target and a capacitance type non-contact sensor, and which detects a relative distance between a tip portion of the objective lens and the sample base via the capacitance type non-contact sensor and the sensor target;

a moving mechanism that moves the objective lens along an optical axis relative to the sample base; and a control unit that controls the moving mechanism based on information detected by the displacement detection system to keep the relative distance between the tip portion of the objective lens and the sample base constant, so as to maintain a focused condition, wherein one of the sensor target and the capacitance type non-contact sensor is provided on the sample base, and the other of the sensor target and the capacitance type non-contact sensor is provided on the tip portion of the objective lens; and wherein the capacitance type non-contact sensor is positioned on an axis which passes through a center of the objective lens when the objective lens is not inclined, and which is perpendicular to an expected inclination direction of the objective lens.

5. A microscope apparatus according to claim 4, further comprising an observation optical system including the objective lens, wherein the control unit adjusts the relative distance between the tip portion of the objective lens and the sample base in steps smaller than a focal depth of the observation optical system.

6. A microscope apparatus according to claim 5, wherein the control unit includes a storage unit that stores a predetermined observation position and a relative distance between the tip portion of the objective lens and the sample base at the observation position, and adjusts the relative distance between the tip portion of the objective lens and the sample base to the relative distance stored in the storage unit at predetermined time intervals.

* * * * *